United States Patent
Adkinson et al.

(10) Patent No.: US 9,796,794 B2
(45) Date of Patent: Oct. 24, 2017

(54) IONOMER COMPRISING PENDANT VINYL GROUPS AND PROCESSES FOR PREPARING SAME

(71) Applicant: LANXESS Butyl Pte. Ltd., Singapore (SG)

(72) Inventors: Dana K. Adkinson, London (CA); Jacob Rawski, London (CA); Sean Malmberg, London (CA); Gregory J. E. Davidson, London (CA)

(73) Assignee: LANXSS, Inc., Sarnia, CA (US)

( * ) Notice: Subject to any disclaimer, the term of this patent is extended or adjusted under 35 U.S.C. 154(b) by 130 days.

(21) Appl. No.: 14/653,312

(22) PCT Filed: Dec. 18, 2013

(86) PCT No.: PCT/CA2013/001044
§ 371 (c)(1),
(2) Date: Jun. 18, 2015

(87) PCT Pub. No.: WO2014/094121
PCT Pub. Date: Jun. 26, 2014

(65) Prior Publication Data
US 2016/0108140 A1    Apr. 21, 2016

Related U.S. Application Data

(60) Provisional application No. 61/739,875, filed on Dec. 20, 2012.

(51) Int. Cl.
  *C08J 3/24* (2006.01)
  *C08C 19/32* (2006.01)

(52) U.S. Cl.
  CPC .............. *C08C 19/32* (2013.01); *C08J 3/24* (2013.01); *C08J 2315/00* (2013.01); *C08J 2323/22* (2013.01)

(58) Field of Classification Search
  CPC .............................. C08C 19/32; C08J 2323/22
  See application file for complete search history.

(56) References Cited

U.S. PATENT DOCUMENTS

| | | |
|---|---|---|
| 7,446,151 B2 | 11/2008 | Resendes et al. |
| 7,915,333 B2 | 3/2011 | Resendes et al. |
| 2009/0182095 A1 | 7/2009 | Resendes et al. |
| 2009/0299000 A1 | 12/2009 | Resendes et al. |
| 2010/0010140 A1 | 1/2010 | Resendes et al. |
| 2015/0274941 A1 | 10/2015 | Endtner et al. |
| 2015/0724940 | 10/2015 | Endtner et al. |

FOREIGN PATENT DOCUMENTS

| | | | | |
|---|---|---|---|---|
| CA | 2458741 A1 | 8/2005 | | |
| CA | WO 2012075574 A1 | * | 6/2012 | ............. A01N 25/10 |
| CA | WO 2012083419 A1 | * | 6/2012 | ............ C08F 210/12 |
| JP | 6172547 A2 | 6/1994 | | |

OTHER PUBLICATIONS

Encyclopedia of Polymer Science and Engineering, "Compounding" vol. 4, 1986 John Wiley & sons, Inc., pp. 66-79.
Parent, J. Scott, et al., "Synthesis and Characterization of Isobutylene-Based Ammonium and Phosphonium Bromide Ionomers", Macromolecules 2004, 37, American Chemical Society, pp. 7477-7483.
Parent, J. Scott, et al., "Isobutylene-based ionomer composites: siliceous filler reinforcement", Polymer 45 (2004) pp. 8091-8096.
Parent, J. Scott, et al., "Ion-Dipole Interaction Effects in Isobutylene-based Ammonium Bromide Ionomers", Journal of Polymer Science, Part A: Polymer Chemistry, vol. 43, 2005, Wiley Periodicals, Inc., pp. 5671-5679.
International Search Report from International Application No. PCT/CA2013/001044, dated Mar. 25, 2014, three pages.
Supplementary European Search Report from European Application No. 13865523, dated May 13, 2016, two pages.
Morton, Maurice, Butyl and Halobutyl Rubbers, Rubber Technology, Third Edition, 1987 Van Nostrand Reinhold Company, Inc., pp. 297-300.

\* cited by examiner

*Primary Examiner* — Mark Kaucher

(57) ABSTRACT

The present invention relates to ionomers comprising a reaction product of the reaction between a) a halogenated isoolefin copolymer and b) a nucleophile having no pendant vinyl group and a nucleophile comprising at least one pendant vinyl group. The present invention also relates to a method of preparing and curing these ionomers.

20 Claims, No Drawings

IONOMER COMPRISING PENDANT VINYL GROUPS AND PROCESSES FOR PREPARING SAME

FIELD OF THE INVENTION

The present invention relates to curable butyl rubber derivatives. In particular, the present invention relates to ionomer comprising at least one pendant vinyl group.

BACKGROUND

Poly(isobutylene-co-isoprene) or IIR, is a synthetic elastomer commonly known as butyl rubber (or Butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Halogenation of butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

The development of halogenated butyl rubber (halobutyl) has greatly extended the usefulness of butyl by providing much higher curing rates and enabling co-vulcanization with general purpose rubbers such as natural rubber and styrene-butadiene rubber (SBR). Butyl rubber and halobutyl rubber are high value polymers, as their unique combination of properties (excellent impermeability, good flex, good weatherability, co-vulcanization with high unsaturation rubbers, in the case of halobutyl) make them preferred materials for various applications, such as their use in making tire inner tubes and tire inner liners.

The presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science*, Part A: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004). The ionomer functionality is generated from the reaction of a nitrogen or phosphorus based nucleophile and the allylic halide sites in the halogenated butyl rubber to produce an ammonium or phosphonium ionic group respectively.

Like other rubbers, for most applications, butyl rubber must be compounded and vulcanized (chemically cross-linked) to yield useful, durable end use products. Grades of butyl rubber have been developed to meet specific processing and property needs, and a range of molecular weights, unsaturation, and cure rates. Both the end use attributes and the processing equipment are important in determining the right grade of butyl rubber to use in a specific application.

Peroxide curable butyl rubber compounds offer several advantages over conventional sulfur-curing systems. Typically, these compounds display extremely fast cure rates and the resulting cured articles tend to possess excellent heat resistance. In addition, peroxide-curable formulations are considered to be "clean" in that they do not contain any extractable inorganic impurities (e.g., sulfur). The clean rubber articles can therefore be used, for example, in condenser caps, biomedical devices, pharmaceutical devices (stoppers in medicine-containing vials, plungers in syringes) and possibly in seals for fuel cells.

One approach for obtaining a peroxide-curable butyl-based formulation lies in the use of conventional butyl rubber in conjunction with a vinyl aromatic compound like divinylbenzene (DVB) and an organic peroxide (see Japanese Publication No. 06-107738). In place of DVB, an electron-withdrawing group-containing polyfunctional monomer (ethylene dimethacrylate, trimethylolpropane triacrylate, N,N'-m-phenylene dimaleimide) can also be used (Japanese Publication No. 06-172547).

A commercially available terpolymer based on isobutylene (IB), isoprene (IP) and DVB, XL-10000, is curable with peroxides alone. This material, however, possesses significant levels of DVB. In addition, since the DVB is incorporated during the polymerization process a significant amount of crosslinking occurs during manufacturing. The resulting high Mooney (60-75 MU, ML1+8@125° C.) and presence of gel particles make this material difficult to process.

Canadian Patent No. 2,418,884 and Canadian Patent Application No. 2,458,741 describe the preparation of butyl-based, peroxide-curable compounds which have high multiolefin content. Specifically, CA 2,418,884 describes the continuous preparation of IIR with isoprene levels ranging from 3 to 8 mol %. The elevated level of isoprene in the polymer backbone renders these compounds peroxide curable. Halogenation of this high multiolefin butyl rubber consumes some of this unsaturation and produces a reactive allylic halide functionality within the elastomer. With these elevated levels of isoprene, it is possible to generate BIIR analogues which contain allylic bromide functionalities ranging from 3 to 8 mol %, often with residual double bonds in the polymer backbone. Nucleophilic substitution reactions as described above can be used to create ionomeric moieties from these allylic halide sites, with the residual unsaturation being sufficient to permit peroxide curing. Peroxide curable butyl rubber ionomer compositions with elevated levels of isoprene are described PCT Publication Nos. WO2007/022618 and WO2007/022619.

One of the key failures for elastomeric compounds in dynamic applications is crack growth. Butyl ionomers possess ionic functionalities in addition to unsaturation. When these compounds are cured, there are both reversible ionic crosslinks as well as irreversible chemical crosslinks. The reversible ionic crosslinks allow the butyl ionomers to behave in a "self-healing" manner wherein the polymer chains are able, to a certain extent, flow or be mobilized.

It would therefore be desirable to have butyl rubber ionomer compositions which exhibit better dynamic properties, and physical properties.

SUMMARY OF THE INVENTION

It is an object of the present invention to provide an ionomer comprising a reaction product of the reaction between a halogenated isoolefin copolymer, a first nucleophile having no pendant vinyl group and a second nucleophile comprising at least one pendant vinyl group.

DETAILED DESCRIPTION

The present invention relates to ionomers, processes for preparing these ionomers and processes for curing these ionomers. Particularly, the present invention relates to ionomers with improved dynamic and physical properties. The butyl ionomer is prepared from a halogenated butyl polymer. Butyl polymers are generally derived from at least one isoolefin monomer, at least one multiolefin monomer and optionally further copolymerizable monomers.

The halogenated copolymers used in the present invention are copolymers comprising at least one isoolefin monomer and one or more multiolefin monomers.

The isoolefins suitable for use in the present inventions are hydrocarbon monomers having 4 to 16 carbon atoms. In one embodiment of the present invention, isoolefins have from 4-7 carbon atoms. Examples of isoolefins for use in the present invention include isobutene (isobutylene), 2-methyl-1-butene, 3-methyl-1-butene, 2-methyl-2-butene, 4-methyl-1-pentene, 4-methyl-1-pentene and mixtures. A preferred isoolefin is isobutene (isobutylene).

Multiolefins copolymerizable with the isoolefins, as known to one skilled in the art, can be used in the practice of the present invention. In one embodiment, multiolefin monomers are conjugated dienes. Examples of such multiolefins include, for example, those having in the range of from 4-14 carbon atoms. Examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. A particularly preferred conjugated diene is isoprene.

In the halogenated copolymer one or more of the repeating units derived from the multiolefin monomers comprise an allylic halogen moiety.

The halogenated copolymers useful in the present invention may optionally include an additional co-monomer along with the isoolefin and multiolefin.

Co-monomers include monomers copolymerizable with the isoolefins and/or dienes. Co-monomers suitable for use in the present invention include, for example, styrenic monomers, such as alkyl-substituted vinyl aromatic co-monomers, including but not limited to a $C_1$-$C_4$ alkyl substituted styrene. Specific examples of such co-monomers include, for example, α-methyl styrene, p-methyl styrene, chlorostyrene, cyclopentadiene and methylcyclopentadiene.

In one embodiment of the present invention, the copolymer of the present invention may include, for example, random copolymers of isobutylene, isoprene and para-methylstryene.

In yet another embodiment of the present invention, an isoolefin monomer, as described above, is polymerized with a styrenic monomer, for example an alkyl-substituted vinyl aromatic comonomer, including but not limited to a $C_1$-$C_4$ alkyl substituted styrene. Specific examples of styrenic monomers include, for example, α-methyl styrene, p-methyl styrene, chlorostyrene, cyclopentadiene and methylcyclopentadiene. In this embodiment, the butyl rubber polymer may include, for example, random copolymers of isobutylene and para-methylstryene.

The copolymers of the present invention, as described above, are formed from a mixture of monomers described herein. In one embodiment, the monomer mixture comprises from about 80% to about 99% by weight of an isoolefin monomer and from about 1% to 20% by weight of a multiolefin monomer. In another embodiment, the monomer mixture comprises from about 85% to about 99% by weight of an isoolefin monomer and from about 1% to 15% by weight of a multiolefin monomer. In certain embodiments of the present invention three monomers may be employed. In these embodiments, the monomer mixture comprises about 80% to about 99% by weight of isoolefin monomer, from about 0.5% to about 5% by weight of a multiolefin monomer and from about 0.5% to about 15% by weight a third monomer copolymerizable with the isoolefin or multiolefin monomer. In one embodiment, the monomer mixture comprises from about 85% to about 99% by weight of an isoolefin monomer, from about 0.5% to about 5% by weight of a multiolefin monomer and from about 0.5% to about 10% by weight of a third monomer copolymerizable with the isoolefin or multiolefin monomers. In yet another embodiment, the monomer mixture comprises from about 80% to about 99% by weight of an isoolefin monomer and from about 1% to 20% by weight of a styrenic monomer.

In one embodiment, the halogenated copolymer is obtained by first preparing a copolymer from a monomer mixture comprising one or more isoolefins, one or more multiolefins, followed by subjecting the resulting copolymer to a halogenation process to form the halogenated copolymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

In one embodiment, the multiolefin butyl polymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %.

In one embodiment, the multiolefin butyl polymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment of the present invention, the ionomers may be prepared from a halogenated butyl rubber polymer having from 0.5 to 2.2 mol % of the multiolefin monomer. For example, a halogenated butyl rubber for use in the present invention includes a halogenated butyl rubber having isobutylene and less than 2.2 mole percent isoprene which is commercially available from LANXESS Deutschland GmbH and sold under the name BB2030™. In another embodiment of the present invention, the ionomers may be prepared from a halogenated butyl rubber polymer having a higher multiolefin content, for example greater than 2.5 mol %. In yet another embodiment, the ionomers may be prepared from a halogenated butyl rubber having a multiolefin content of greater than 3.5 mol %. In still another embodiment, the multiolefin content of the halogenated butyl rubber is greater than 4.0 mol %. In even another embodiment, the multiolefin content of the halogenated butyl rubber is greater than 7.0 mol %. The preparation of a suitable high multiolefin butyl rubber polymer, for use in the present invention, is described in co-pending application CA 2,418,884, which is incorporated herein by reference.

During halogenation, some or all of the multiolefin content of the copolymer is converted to units comprising allylic halides. These allylic halide sites in the halobutyl polymer result in repeating units derived from the multiolefin monomers originally present in the butyl polymer. The total allylic halide content of the halogenated polymer cannot exceed the starting multiolefin content of the parent copolymer. The allylic halide sites allow for reacting with and attaching one or more nucleophiles to the halobutyl polymer.

The ionomers of the present invention are obtained by reacting a halogenated isoolefin copolymer with a first nucleophile having no pendant vinyl group and a second nucleophile comprising a pendant vinyl group.

It has been surprisingly found that the ionomer formed by reacting a halogenated isoolefin copolymer with a nucleophile having no pendant vinyl group and a nucleophile comprising a pendant vinyl group in specific amounts and/or specific relative ratios exhibit improvement in beneficial physical properties such as in crack growth resistance without sacrificing other physical properties.

Nucleophiles (with or without pendent vinyl group) suitable for the preparation of the ionomers of the present invention contain at least one neutral phosphorus or nitrogen center which possesses a lone pair of electrons which is both electronically and sterically accessible for participation in nucleophilic substitution reactions.

In one embodiment of the present invention, the allylic halide sites of the halogenated copolymers of the present invention are reacted with nucleophiles (with or without a pendant vinyl group) having the following base formula,

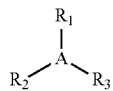

wherein,

A is a nitrogen or phosphorus; and, $R_1$, $R_2$ and $R_3$ are independently:

a linear or branched $C_1$-$C_{18}$ alkyl group optionally comprising one or more hetero atoms, $C_6$ to $C_{10}$ aryl; $C_3$-$C_6$ heteroaryl; $C_3$-$C_6$ cycloalkyl; $C_3$-$C_6$ heterocycloalkyl; or combinations thereof.

Nucleophiles for use in the present invention include, for examples, those nucleophiles having at least one neutral nitrogen or phosphorus center which possesses a lone pair of electrons that are electronically and sterically accessible for participation in nucleophilic substitution reactions.

Suitable phosphorous nucleophiles comprising a pendant vinyl group include, but are not limited to diphenylphosphinostyrene, allyldiphenylphosphine, diallylphenylphosphine, diphenylvinylphosphine, triallylphosphine, or mixtures thereof.

In one embodiment, the phosphorus nucleophile comprising a pendant vinyl group for use with the present invention is diphenylphosphinostyrene (DPPS), shown below.

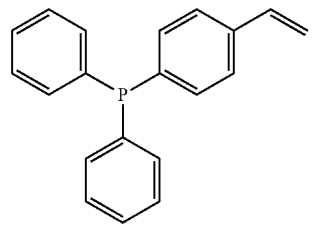 [SMILES: C=Cc1ccc(P(c2ccccc2)c2ccccc2)cc1]

Suitable nucleophiles having no pendant vinyl group include, but are not limited to trimethylamine, triethylamine, triisopropylamine, tri-n-butylamine, trimethylphosphine, triethylphosphine, triisopropylphosphine, tri-n-butylphosphine, triphenylphosphine, 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)-diethanol, tris[2-(2-methoxyethoxy)ethyl]amine, 3-(dibenzylamino)-1-propanol, N-vinyl caprolactam, N-vinyl phthalimide, 9-vinyl carbazole, or N-[3-(Dimethylamino)propyl]methacrylamide, and mixtures thereof.

As stated above, the nucleophiles react with the allylic halide functionality of the halogenated copolymer resulting in units of ionomeric moieties where the allylic halide functionality existed on the halogenated copolymer. The total content of ionomeric moiety in the resulting ionomer may not exceed the starting amount of allylic halide in the halogenated copolymer; however, residual allylic halides and/or residual multiolefins may be present.

The ratio of the first nucleophile to the second nucleophile used in the formation of the ionomers of the present invention is from 4:1 to 100:1. In one embodiment, the ratio of the first nucleophile to the second nucleophile is from 4:1 to 50:1.

In one embodiment, the ratio of the first nucleophile to the second nucleophile is 20:1. In yet another embodiment, the ratio of the first nucleophile to the second nucleophile is 4:1.

In one embodiment, total amount of the two nucleophiles used in the formation of the ionomers of the present invention is less than 5 phr. In another embodiment, the total amount of the two nucleophiles is from about 1 to about 4 phr. In another embodiment, the total amount of the two nucleophiles is 2.5 phr. In yet another embodiment, the total amount of the two nucleophiles is 2.1 phr.

In one embodiment, the ratio of the first nucleophile to the second nucleophile is 20:1, and the total amount of the two nucleophiles is 2.1 phr.

In one embodiment, the ratio of the first nucleophile to the second nucleophile is 4:1, and the total amount of the two nucleophiles is 2.5 phr.

In one embodiment, the copolymer is reacted simultaneously with the nucleophile having no pendant vinyl group, and the nucleophile comprising a pendant vinyl group.

In another embodiment, the copolymer is reacted sequentially with the nucleophile having no pendant vinyl group (the first nucleophile), followed by the nucleophile comprising a pendant vinyl group (the second nucleophile). In another embodiment, such a reaction can be carried out by reacting the first and second nucleophiles with the copolymer at different reaction conditions in a two stage reaction.

In one embodiment of the two stage reaction, the reactions of the two nucleophiles with the copolymer are carried out at different temperatures and/or for different time periods.

The reaction between the nucleophile having no pendant vinyl group and the copolymer can be carried out at a temperature from about 60° C. to about 200° C. In one embodiment, the reaction between the nucleophile having no pendant vinyl group and the copolymer is carried out at a temperature about 80° C. to about 160° C. In a another embodiment, the reaction between the nucleophile having no pendant vinyl group and the copolymer is carried out at a temperature about 100° C. to about 140° C.

In one embodiment, the copolymer and the nucleophile having no pendant vinyl group is reacted for about 0.5 to 60 minutes. In another embodiment, the copolymer and the nucleophile having no pendant vinyl group is reacted for about 1 to 30 minutes. In another embodiment, the copolymer and the nucleophile having no pendant vinyl group is reacted for about 5 to 15 minutes.

The reaction between the nucleophile comprising a pendant vinyl group and the copolymer can be carried out at a temperature from about 60° C. to about 200° C. In another embodiment, the reaction between the nucleophile comprising a pendant vinyl group and the copolymer is carried out at a temperature about 70° C. to about 150° C. In a another embodiment, the reaction between the nucleophile comprising a pendant vinyl group and the copolymer can be carried out at a temperature from about 80° C. to about 120° C. In another embodiment, the reaction between the nucleophile comprising a pendant vinyl group and the copolymer can be carried out at a temperature from about 90° C. to about 100° C.

In one embodiment, the copolymer and the nucleophile comprising a pendant vinyl group is reacted for about 0.5 to 120 minutes. In another embodiment, the copolymer and the nucleophile comprising a pendant vinyl group is reacted for about 5 to 50 minutes. In yet another embodiment, the copolymer and the nucleophile comprising a pendant vinyl group is reacted for about 25 to 45 minutes In one embodiment, the reaction between the copolymer and the nucleophile having no pendant vinyl group is carried out at a temperature of about 130° C., for 10 minutes.

In one embodiment, the reaction between the copolymer and the nucleophile comprising a pendant vinyl group is carried out at a temperature of about 90° C., for 35 minutes.

The ionomer of the present invention, may include one or more fillers. Suitable fillers for use in the present invention are composed of particles of a mineral, such as, for example, silica, silicates, clay, bentonite, vermiculite, nontronite, beidelite, volkonskoite, hectorite, saponite, laponite, sauconite, magadiite, kenyaite, ledikite, gypsum, alumina, titanium dioxide, talc and the like, as well as mixtures thereof.

Further examples of suitable fillers include:
highly dispersable silicas, prepared e.g. by the precipitation of silicate solutions or the flame hydrolysis of silicon halides, with specific surface areas of 5 to 1000, preferably 20 to 400 $m^2/g$ (BET specific surface area), and with primary particle sizes of 10 to 400 nm; the silicas can optionally also be present as mixed oxides with other metal oxides such as Al, Mg, Ca, Ba, Zn, Zr and Ti;

synthetic silicates, such as aluminum silicate and alkaline earth metal silicate;

magnesium silicate or calcium silicate, with BET specific surface areas of 20 to 400 $m^2/g$ and primary particle diameters of 10 to 400 nm;

natural silicates, such as kaolin and other naturally occurring silica;

natural clays, such as montmorillonite and other naturally occurring clays;

organophilically modified clays such as organophilically modified montmorillonite clays (e.g. Cloisite® Nanoclays available from Southern Clay Products) and other organophilically modified naturally occurring clays;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide or combinations thereof.

In one embodiment of the present invention, the mineral filler is silica. In another embodiment the mineral filler is silica prepared by the carbon dioxide precipitation of sodium silicate.

Dried amorphous silica particles suitable for use as mineral fillers in accordance with the present invention may have a mean agglomerate particle size in the range of from 1 to 100 microns. In one embodiment of the present invention, the dried amorphous silica particles have a mean agglomerate particle size in the range of from 10 and 50 microns. In another embodiment of the present invention, the dried amorphous silica particles have a mean agglomerate particle size in the range of from between 10 and 25 microns. In one embodiment of the present invention, it is contemplated that less than 10 percent by volume of the agglomerate particles are below 5 microns or over 50 microns in size. Suitable amorphous dried silica has, for example, a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially sold under the names HiSil 210, HiSil 233 and HiSil 243 available from PPG Industries Inc. Also suitable are Vulkasil S and Vulkasil N, commercially available from Bayer AG.

Mineral fillers, as used in the present invention, can also be used alone or in combination with known non-mineral fillers, such as:

carbon blacks; suitable carbon blacks are preferably prepared by the lamp black, furnace black or gas black process and have BET specific surface areas of 20 to 200 $m^2/g$, for example, SAF, ISAF, HAF, FEF or GPF carbon blacks;
or
rubber gels, preferably those based on polybutadiene, butadiene/styrene copolymers, butadiene/acrylonitrile copolymers and polychloroprene.

High aspect ratio fillers useful in the present invention include clays, talcs, micas, etc. with an aspect ratio of at least 1:3. The fillers may include acircular or nonisometric materials with a platy or needle-like structure. The aspect ratio is defined as the ratio of mean diameter of a circle of the same area as the face of the plate to the mean thickness of the plate. The aspect ratio for needle and fiber shaped fillers is the ratio of length to diameter. In one embodiment of the present invention, high aspect ratio fillers have an aspect ratio of at least 1:5. In another embodiment of the present invention, high aspect ratio fillers have an aspect ratio at least 1:7. Yet in another embodiment, high aspect ratio fillers have an aspect ratio 1:7 to 1:200. Fillers in accordance with the present invention may have, for example, a mean particle size in the range of from 0.001 to 100 microns. In another embodiment, fillers have a mean particle size in the range of from 0.005 and 50 microns. In another embodiment, fillers have a mean particle size in the range of from 0.01 and 10 microns. A suitable filler may have a BET surface area, measured in accordance with DIN (Deutsche Industrie Norm) 66131, of between 5 and 200 square meters per gram.

In one embodiment of the present invention, high aspect ratio fillers comprises a nanoclay, such as, for example, an organically modified nanoclay. The present invention is not limited to a specific nanoclay; however, natural powdered smectite clays, such as sodium or calcium montmorillonite, or synthetic clays such as hydrotalcite and laponite are suitable examples as starting materials. In one embodiment, the high aspect fillers include organically modified montmorillonite nanoclays. The clays may be modified by substitution of the transition metal for an onium ion, as is known in the art, to provide surfactant functionality to the clay that aids in the dispersion of the clay within the generally hydrophobic polymer environment. In one embodiment of the present invention, onium ions are phosphorus based (eg: phosphonium ions) and nitrogen based (eg: ammonium ions) and contain functional groups having from 2 to 20 carbon atoms (eg: $NR_4^{+-}MMT$).

The clays may be provided, for example, in nanometer scale particle sizes, such as, less than 25 μm by volume. In one embodiment, the particle size is in the range of from 1 to 50 μm. In another embodiment, the particle size is in the range of from 1 to 30 μm. In yet another embodiment, the particle size is in the range of from 2 to 20 μm.

In addition to silica, the nanoclays may also contain some fraction of alumina. In one embodiment, the nanoclays may contain from 0.1 to 10 wt % alumina. In another embodiment the nanoclays may contain from 0.5 to 5 wt % alumina. In yet anther embodiment, the nanoclays may contain from 1 to 3 wt % alumina.

Examples of commercially available organically modified nanoclays suitable for use in the present invention as high aspect ratio fillers include, for example, those sold under the tradename Cloisite® clays 10A, 20A, 6A, 15A, 30B, or 25A. In one embodiment, the high aspect ratio fillers may be added to the pre-formed butyl rubber ionomer to form a nanocomposite in an amount of from 3 to 80 phr. In another embodiment, the amount of high aspect ratio fillers in the nanocomposite is from 5 to 30 phr. In yet another embodiment, the amount of high aspect ratio fillers in the nanocomposite is from 5 to 15 phr.

The ionomer of the present invention may be cured or uncured. The choice of curing system suitable for use is not particularly restricted and is within the purview of a person skilled in the art. In certain embodiments of the present invention, curing system may be sulphur-based, peroxide-based, resin based or UV-based.

A typical sulfur-based curing system comprises: (i) a metal oxide, (ii) elemental sulfur and (iii) at least one sulfur-based accelerator. The use of metal oxides as a component in the sulphur curing system is well known in the art. A suitable metal oxide is zinc oxide, which may be used in the amount of from about 1 to about 10. In another embodiment of the present invention, the zinc oxide may be used in an amount of from about 2 to about 5, parts by weight per hundred parts by weight butyl polymer in the nanocomposite. Elemental sulfur, comprising component (ii) of the preferred curing system is typically used in amounts of from about 0.2 to about 2 parts by weight, per hundred parts by weight butyl polymer in the composition. Suitable sulfur-based accelerators (component (iii) of the preferred curing system) may be used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). In one embodiment of the present invention, the sulphur based accelerator is mercaptobenzothiazyl disulfide.

Peroxide based curing systems may also be suitable for use with the ionomers of the present invention, such as for butyl rubber ionomer latexes including residual multiolefin content in excess of about 0.2 mol %. For example, a peroxide-based curing system may comprises a peroxide curing agent, for example, dicumyl peroxide, di-tert-butyl peroxide, benzoyl peroxide, 2,2'-bis(tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy)hexane, (2,5-bis(tert.-butylperoxy)-2,5-dimethyl hexane and the like. One such peroxide curing agent comprises dicumyl peroxide and is commercially available under the name DiCup 40C.

In one embodiment, the peroxide curing agent is used in an amount of 0.2 to 7 parts per hundred parts of rubber (phr). In another embodiment, the peroxide curing agent is used in an amount of 1 to 6 phr. In yet another embodiment, the peroxide curing agent is used in an amount of about 4 phr.

Peroxide curing co-agents can also be used in the present invention. Suitable peroxide curing co-agents include, for example, triallyl isocyanurate (TAIC), commercially available under the name DIAK 7 from DuPont Or N,N'-m-phenylene dimaleimide know as HVA-2 (DuPont Dow), triallyl cyanurate (TAC) or liquid polybutadiene known as Ricon D 153 (supplied by Ricon Resins). Peroxide curing co-agents may be used in amounts equivalent to those of the peroxide curing agent, or less. The state of peroxide cured articles is enhanced with butyl polymers containing increased levels of unsaturation, for example a multiolefin content of at least 0.5 mol %.

In some embodiments of the present invention, stabilizers, anti-oxidants, tackifiers, and/or other additives as known to those of skill in the art may also be added in the usual way and in the normal amounts.

Additionally, fillers, and/or other additives may be added to the ionomer.

In embodiments where the composition includes the ionomer, fillers, and/or other additives, the ingredients may be compounded together using conventional compounding techniques. Suitable compounding techniques include, for example, mixing the ingredients of the composite together using, for example, an internal mixer, such as a Banbury mixer, a miniature internal mixer, such as a Haake or Brabender mixer, or a two roll mill mixer. An extruder also provides good mixing, and permits shorter mixing times. It is possible to carry out the mixing in two or more stages, and the mixing can be done in different apparatus, for example one stage in an internal mixer and one stage in an extruder. For further information on compounding techniques, see Encyclopedia of Polymer Science and Engineering, Vol. 4, p. 66 et seq. (Compounding). Other techniques, as known to those of skill in the art, are further suitable for compounding.

In one embodiment, the curing is achieved by heating the ionomers of the present invention at a suitable curing temperature in the presence of a peroxide curing agent.

In one embodiment, the curing temperature is about 80° C. to about 250° C. In another embodiment, the curing temperature is about 100 to 200° C. In another embodiment, the curing temperature is about 120 to 180° C.

In one aspect, the present invention relates to the cured polymer and articles comprising the ionomer as defined and described above.

The ionomers of the present invention can be useful for applications such as belts, hoses, shoe soles, gaskets, o-rings, wire/cable, membranes, rollers, bladders, etc.

The invention will now be described with reference to specific examples. It will be understood that the following examples are intended to describe embodiments of the invention and are not intended to limit the invention in any way.

Materials and Reagents

Triphenylphosphine (TPP) was obtained from Alfa Aesar and used as received. BB2030 was obtained from LANXESS Inc in Sarnia, stored in dark wrap at room temperature and used as received. DPPS was obtained from Hokko and used as received. Irganox 1010 was purchased from Ciba and used as received. Carbon black N330 was obtained from Cabot and used as received. Di-cup 40C was obtained from Struktol Canada Ltd. and used as received. HVA-2 was obtained from DuPont and used as received. Polyethylene AC-617A was obtained from Canada Colors and Chemicals Ltd. and used as received.

Analysis of Ionomer Reaction

The rubber samples were analyzed by $^1$H NMR using a Bruker DRX500 spectrometer (500.13 MHz $^1$H) in CDCl$_3$ using one hundred scans with chemical shifts referenced to tetramethylsilane (TMS) to determine ionic content.

Compounding Procedure and Equipment

Samples were compounded according to the following recipe:
100 phr of polymer [0 to 60 seconds]
50 phr of carbon black (N330) [60 seconds]
2 phr of polyethylene AC-617A [with carbon black]
Mixed until about 145° C. (about 5 minutes), then dumped from the mixer.
Compounds were then milled at 40° C.:
1.25 phr Di-Cup 40C
1.75 phr HVA-2
6¾ cuts and 6 endwise passes were done on the mill.
Samples were cured within 24 hours of introducing the curatives.

Compound Testing Equipment and Procedures

TABLE 1

Equipment and procedures

| Equipment | ASTM # | Conditions |
|---|---|---|
| MDR 200 (Moving Dye Rheometer) | ASTM D 5289 | 160° C., 30 minutes, 1° arc 1.7 Hz |
| Compound Mooney Scorch | ASTM D 1646 | 138° C. for 30 minutes |
| Mooney Viscometer | ASTM D 1646 | ML(1 + 4) at 100° C. |

TABLE 1-continued

Equipment and procedures

| Equipment | ASTM # | Conditions |
|---|---|---|
| DeMattia Flexion tester | ASTM D 813 | punched samples (2 mm) and tested to a maximum of 250 000 cycles at room temperature |
| Alpha Technologies T2000 (tensometer) | ASTM D 412 ASTM D 624 | Dye C, room temperature Dye C tear, room temperature |
| Tension set (elongation set, permanent set) | ASTM D 412 | Dye T50 specimens, room temperature and 100° C. (convection oven) |

A Brabender miniature internal mixer with capacity of 375 mL was used in order to create the ionomers and to mix compounds containing carbon black.

EXAMPLES

The following ionomers were prepared, cured in the presence of peroxide, and their physical and dynamic properties were evaluated as shown in Tables 2A and 2B. As evident from these Tables, the TPP/DPPS ionomer displays enhanced tensile strength, slight increase in tear strength and significant improvement in crack growth resistance.

Example 1: Comparative

The polymer used in this comparative example is the commercial LANXESS BB2030 (polymer 1).

Example 2

Triphenylphosphine (TPP) (2 phr) was added to BB2030 in an internal mixer at 130° C. at 60 rpm for 10 minutes to form butyl phosphonium ionomer with 0.33 mol % ionic functionality (ionomer 1). The ionomer was then compounded using the procedure as discussed above.

Example 3

TPP(2 phr) was added to BB2030 in an internal mixer at 130° C. 60 rpm for 10 minutes to form butyl phophonium ionomer with 0.33 mol % ionic functionality. Then 0.5 phr of diphenylphosphinostyrene (DPPS) added to the ionomer in an internal mixer at 90° C. at 30 rpm for 35 minutes, resulting in a dual ionomer with both TPPS and DPPS-ionomers (ionomer 2). The resulting ionomer was then compounded using the procedure as discussed above.

Two stages of mixing were completed for compounds containing both TPP and DPPS ionomer nucleophiles, starting with the TPP ionomer reaction.

TABLE 2A

|  |  | Polymer 1 | Ionomer 1 | Ionomer 2 |
|---|---|---|---|---|
| Delta Torque |  | 17.07 | 9.2 | 10.51 |
| T'90 (@160° C.)(min) |  | 20.26 | 25.76 | 24.58 |
| Ultimate Tensile (MPa) |  | 15.3 | 15.9 | 17.3 |
| Ultimate Elongation (%) |  | 217 | 505 | 532 |
| Tear Strength | unaged | 23 | 35 | 38 |
|  | aged | 11 | 50 | 52 |
| Crack Growth (kc) | @300% | 0.531 | 17.7 | 36.7 |
|  | @600% | 1.128 | 66.7 | 120.7 |

TABLE 2B

|  |  | Polymer 1 | Ionomer 2 | Ionomer 3 | Ionomer 4 | Ionomer 5 | Ionomer 6 | Ionomer 7 | Ionomer 8 |
|---|---|---|---|---|---|---|---|---|---|
| Mixed 130° C. for 10 min at 60 rpm | BB2030 phr | 100 | 100 | 100 | 100 | 100 | 100 | 100 | 100 |
|  | TPP phr | 0 | 2 | 0.1 | 0.5 | 5 | 0 | 5 | 2.5 |
|  | Mol % Ionomer after stage 1 | n/a | 0.33 | 0.01 | 0.07 | 0.6 | 0 | 0.6 | 0.39 |
| Mixed 90° C. 35 min, 30 rpm | DPPS phr | 0 | 0.1 | 2 | 2 | 0 | 5 | 5 | 2.5 |
|  | Total ionomer mol % after stage 2 | n/a | 0.116 | 0.127 | 0.118 | 0.191 | 0.107 | 0.165 | 0.156 |
| MDR | Test Temperature (° C.) | 160 | 160 | 160 | 160 | 160 | 160 | 160 | 160 |
|  | Degree Arc (°) | 1 | 1 | 1 | 1 | 1 | 1 | 1 | 1 |
|  | Delta MH-ML (dN · m) | 16.96 | 8.01 | 16.13 | 15.19 | 4 | 3.8 | 9.16 | 7.57 |
|  | t' 90 (min) | 21 | 26 | 18 | 20 | 26 | 6 | 25 | 20.34 |
| Tensile | Hardness Shore A2 (pts.) | 62.8 | 61.6 | 63.0 | 63.3 | 62.6 | 64.4 | n/a | n/a |
|  | Stress @ 100% (MPa) | 2.18 | 1.83 | 4.36 | 3.25 | 1.85 | 2.12 | n/a | n/a |
|  | Stress @ 300% (MPa) | 11.84 | 6.72 | 16.48 | 13.17 | 4.86 | 5.45 | n/a | n/a |
|  | Ultimate Tensile (MPa) | 14.51 | 12.69 | 15.63 | 16.69 | 9.87 | 8.86 | n/a | n/a |
|  | Ultimate Elongation (%) | 377 | 646 | 249 | 430 | 655 | 608 | n/a | n/a |
| Tear strength | Tear Strength (kN/m) | 23 | 42. | 26 | 31 | 49 | 36 | n/a | n/a |
| DeMattia Flex testing | Crack Growth unaged 300% (Kc) | 0.6 | 148 | 0.4 | 2.3 | >250 | 68 | n/a | n/a |
|  | Crack Growth unaged 600% (Kc) | 1.6 | >250 | 1.0 | 6.4 | >250 | 186 | n/a | n/a |
| Permeation | Permeation rate of $O_2$ (cc * mm/[m^2/day]) | 146.2 | 138.1 | 136.3 | 136.6 | 136.2 | 110.9 | n/a | n/a |

All documents cited in the Detailed Description of the invention are, in relevant part, incorporated herein by reference; the citation of any document is not to be construed as an admission that it is prior art with respect to the present invention.

Although the invention has been described in detail in the foregoing for purposes of illustration, it is understood that such detail is solely for that purpose and that variations can be made therein by those skilled in the art without departing from the spirit and scope of the invention except as it may be limited by the claims.

What is claimed is:

1. An ionomer comprising a reaction product of a reaction between:
   a) halogenated isoolefin copolymer comprising repeating units derived from at least one isoolefin monomer and repeating units derived from one or more multiolefin monomers; and
   b) nucleophiles comprising at least one first nucleophile having no pendant vinyl group, and at least one second nucleophile comprising at least one pendant vinyl group;
   wherein a weight ratio of the first nucleophile to the second nucleophile is 4:1 to 100:1.

2. The ionomer of claim 1, wherein a total amount of the two nucleophiles in the reaction is less than 5 phr.

3. The ionomer of claim 1, wherein one or more of the repeating units derived from the multiolefin monomers comprise an allylic halogen moiety.

4. The ionomer of claim 1, further comprising repeating units derived from a co-monomer.

5. The ionomer of claim 4, wherein the co-monomer is a $C_1$-$C_4$ or halogen substituted styrene.

6. The ionomer of claim 1, wherein:
   the isoolefin monomer comprises a $C_4$ to $C_a$ isomonoolefin monomer; and
   the one or more multiolefin monomers are selected from $C_4$-$C_{16}$ conjugated diolefins.

7. The ionomer of claim 1, wherein:
   the isoolefin monomer comprises isobutylene; and
   the conjugated diolefin is isoprene.

8. The ionomer of claim 1, wherein:
   the ratio of the first nucleophile to the second nucleophile is 4:1 to 50:1;
   the total amount of the first and second nucleophiles in the reaction is about 1 to about 4 phr;
   the halogenated isoolefin copolymer comprises halobutyl rubber;
   the first nucleophile is selected from the group consisting of trimethylphosphine, triethylphosphine, triisopropylphosphine, tri-n-butylphosphine, triphenylphosphine, and mixtures thereof; and
   the second nucleophile is selected from the group consisting of diphenylphosphinostyrene, allyldiphenylphosphine, diallylphenylphosphine, diphenylvinylphosphine, triallylphosphine, and mixtures thereof.

9. The ionomer of claim 1, wherein:
   the first nucleophile is triethylphosphine; and
   the second nucleophile is diphenylphosphinostyrene.

10. A process for preparing an ionomer, the process comprising:
    contacting a halogenated isoolefin copolymer and nucleophiles to produce a reaction mixture, wherein;
    the halogenated isoolefin copolymer comprises repeating units derived from at least one isoolefin monomer and repeating units derived from one or more multiolefin monomers,
    the nucleophiles comprise at least one first nucleophile having no pendant vinyl group and at least one second nucleophile comprising at least one pendant vinyl group, and
    a weight ratio of the first nucleophile to the second nucleophile is 4:1 to 100:1; and
    reacting halogen moieties of the halogenated copolymer with the nucleophiles to form the ionomer.

11. The process according to claim 10, wherein the total amount of the first and second nucleophiles in the reaction mixture is less than 5 phr.

12. The process according to claim 10, wherein the process comprises contacting the copolymer with the first nucleophiles for a first reaction between the copolymer and the first nucleophiles, followed by contacting the copolymer with the second nucleophiles for a second reaction with the second nucleophiles.

13. The process according to claim 12, wherein the first and second reactions between the copolymer and first and second nucleophiles are carried out at different conditions.

14. The process according to claim 12, wherein:
the first reaction between the copolymer and the first nucleophile is carried out at a temperature of about 130° C., for 10 minutes; and
the second reaction between the copolymer and the second nucleophile is carried out at a temperature of about 90° C., for 35 minutes.

15. The process according to claim 10, wherein the halogenated isoolefin copolymer further comprises repeating units derived from a $C_1$-$C_4$ or halogen substituted styrene.

16. The process according to claim 10, wherein:
the halogenated isoolefin copolymer comprises halobutyl rubber;
the first nucleophile is selected from the group consisting of trimethylphosphine, triethylphosphine, triisopropylphosphine, tri-n-butylphosphine, triphenylphosphine, and mixtures thereof, and
the second nucleophile Is selected from the group consisting of diphenylphosphinostyrene (DPPS), allyldiphenylphosphine, diallylphenylphosphine, diphenylvinylphosphine, triallylphosphine, and mixtures thereof.

17. The process according to claim 10, further comprising curing the ionomer by healing at a curing temperature.

18. The process according to claim 17, wherein the curing temperature is about 80° C. to about 250° C. and the curing comprises adding a peroxide curing agent.

19. The process according to claim 18, wherein the process further comprises admixing a peroxide curing co-agent with the peroxide curing agent and the ionomer.

20. The process according to claim 19, wherein:
the peroxide curing agent is added in an amount of from 0.2 to 7 phr;
the peroxide curing agent is selected from the group consisting of dicumyl peroxide, di-tert-butyl peroxide, benzoyl peroxide, 2,2'-bis (tert-butylperoxy) diisopropylbenzene, benzoyl peroxide, 2,5-dimethyl-2,5-di (tert-butylperoxy)-hexyne-3, 2,5-dimethyl-2,5-d(benzolyperoxy)hexane, (2,5-bis(tert-butylperoxy)-2,5-dimethyl hexane, and mixtures thereof; and
the co-agent is selected from the group consisting of triallyl isocyanurate (TAIC), N,N'-m-phenylene dimaleimide, triallyl cyanurate (TAC), liquid polybutadiene, and mixtures thereof.

* * * * *

UNITED STATES PATENT AND TRADEMARK OFFICE
CERTIFICATE OF CORRECTION

Page 1 of 1

PATENT NO. : 9,796,794 B2
APPLICATION NO. : 14/653312
DATED : October 24, 2017
INVENTOR(S) : Dana Adkinson et al.

It is certified that error appears in the above-identified patent and that said Letters Patent is hereby corrected as shown below:

On the Title Page

(73) Assignee "LANXSS, Inc." should be changed to -- LANXESS, Inc. --

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*